United States Patent Office 3,227,397
Patented Jan. 4, 1966

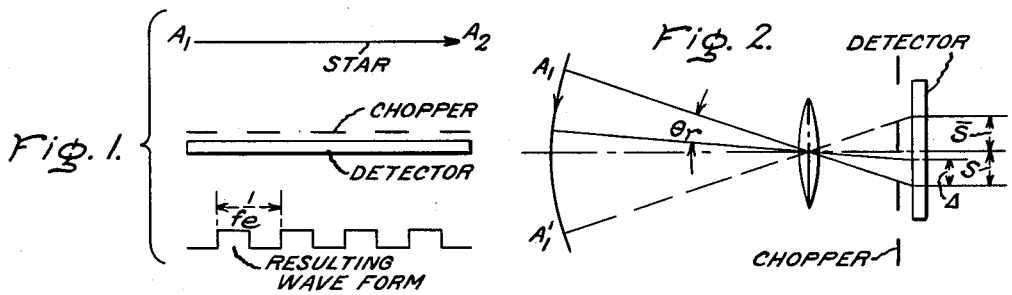
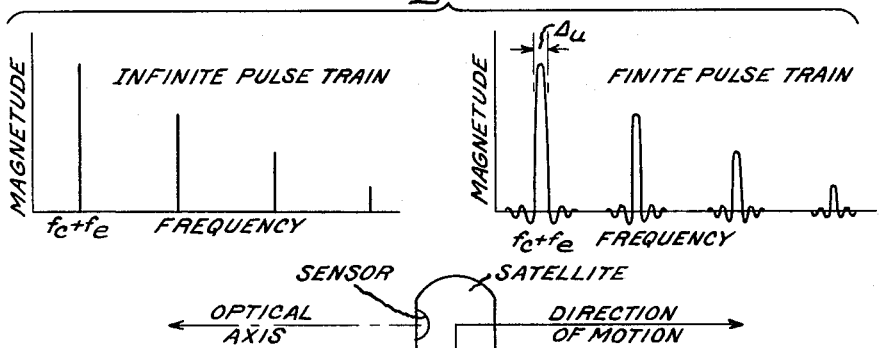
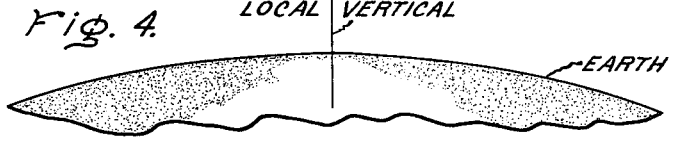
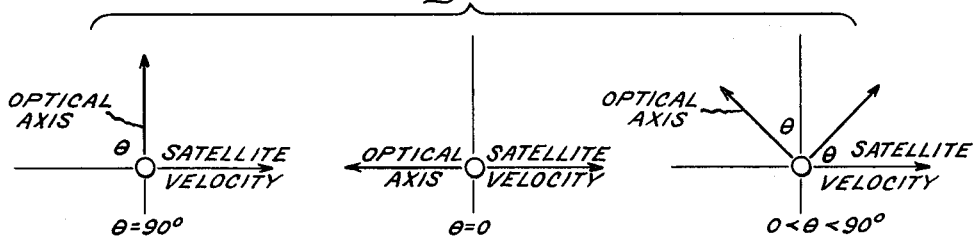
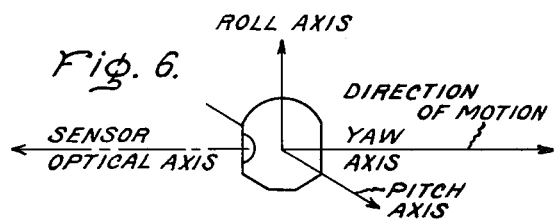

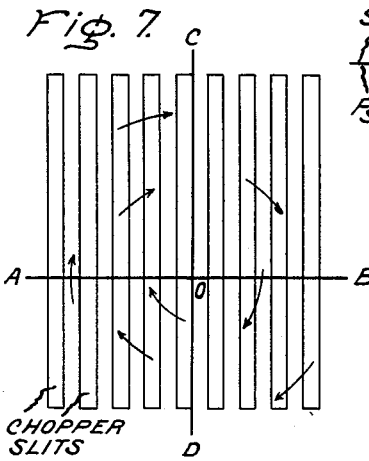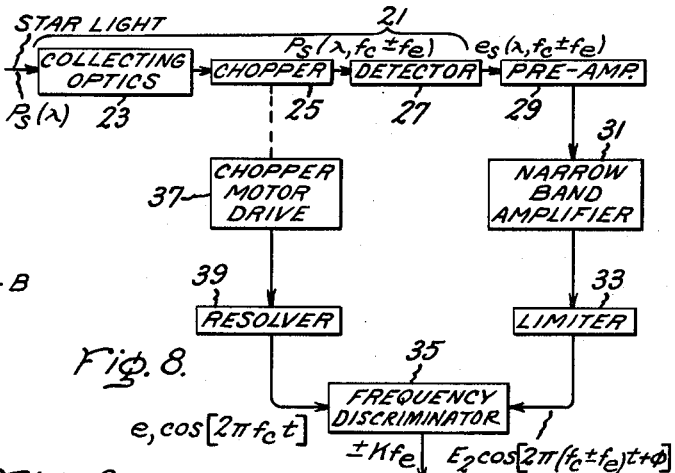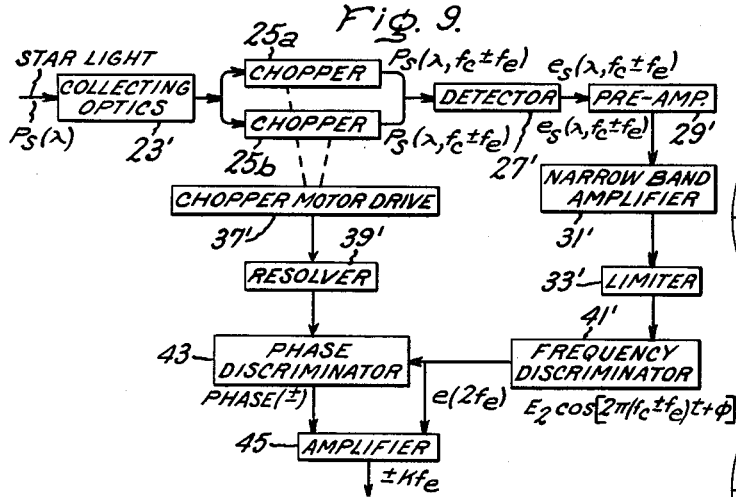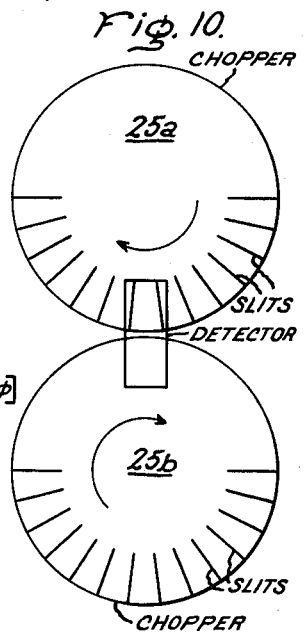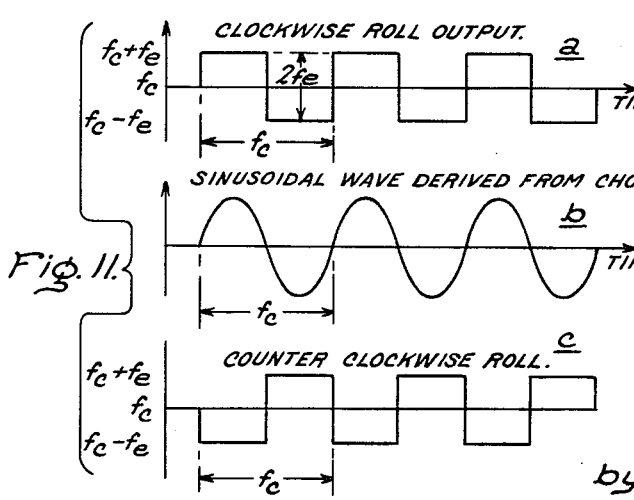

3,227,397
ROLL RATE STABILIZATION SYSTEM FOR OUTER SPACE VEHICLE
James L. Good, Jr., and William A. Porter, Ithaca, N.Y., assignors to General Electric Company, a corporation of New York
Filed Nov. 30, 1959, Ser. No. 856,298
9 Claims. (Cl. 244—1)

The present invention relates to the space instrumentation art and more particularly to an optical-electronic system that can utilize any star or group of stars to provide roll rate information to a space vehicle.

In order for man to conquer outer space, it is incumbent upon him to devise new methods and systems to permit safe space travel and to be able to orient himself in a new environment. One aspect of space travel to be overcome is that of attitude control of space vehicles. As is well known, when a space vehicle such as a missile is propelled through space it generally experiences an unintentional rotation which is termed "roll."

At present there are several devices which may be used to obtain roll rate information of space vehicles. Two such systems would include the rate gyroscope and star tracking or automatic celestial navigation system. However, because of the power, space, and weight requirements for placing a space vehicle in orbit or for space travel, both the rate gyroscope and star tracking systems are unsuitable. Specifically, the rate gyroscope is a "heavy" system that consumes large power and requires a good deal of space within the vehicle. Star tracking systems are presently limited to operate with radiations from a select group of known stars, and can not operate on any star. Thus, both the rate gyroscope and star tracking systems do not lend themselves readily to systems that have limited power, limited space, and limited weight restrictions.

It is an object of the present invention to provide a roll rate stabilization system for space vehicles that is small, light in weight, and independent of a particular star or group of stars that it is observing.

Another object of the invention is to provide a system that utilizes energy derived from any star or group of stars to produce an error signal proportional to the roll rate of the vehicle in which the system is included.

A further object of the present invention is to provide an optical-electronic system that can use any star or group of stars to provide roll rate information.

Still a further object of the invention is to produce signals which may be used to stabilize the rotation of a body in space about a local vertical.

Other objects and many of the attendant advantages of this invention will be readily appreciated as the same becomes better understood by reference to the following detailed description when considered in connection with the accompanying drawings where:

FIGURE 1 is a drawing of a single stationary star and satellite with the resulting waveform derived from such a system;

FIGURE 2 is a drawing showing the relationship between the roll angle and electrical angle in an optical-mechanical system;

FIGURE 3 illustrates a frequency spectrum of infinite and finite pulse trains;

FIGURE 4 illustrates a satellite in relationship to the earth showing the position of the sensor for the zero roll;

FIGURE 5 is a drawing showing the orientation of the sensor at different roll angles as viewed from the earth;

FIGURE 6 is a physical representation defining the pitch, yaw and roll axes of the sensor;

FIGURE 7 is a physical representation of the yaw attitude as viewed by the sensor;

FIGURE 8 illustrates one embodiment in block diagram form of the roll stabilization system;

FIGURE 9 illustrates a second embodiment in block diagram form of an alternate roll stabilization system; and, FIGURE 10 illustrates the physical arrangement and chopper design for the choppers utilized for the system illustrated in FIGURE 9.

The FIGURES 11a, 11b, and 11c show wave forms derived from a chopper mechanism in response to the roll of the space vehicle.

As mentioned hereinbefore, obtaining reliable roll rate information from space vehicles is important in order for man to travel in outer space. The present invention utilizes stellar light as a basic reference for measuring the roll rate of a vehicle or missile in space. As a space vehicle rolls about the local vertical, its field of view "sees" many stars moving past it. This apparent star motion is translated into a measurable modulating frequency and ultimately into an output voltage that is proportional to this frequency. In brief, applicants provide a system including sensors to stabilize a satellite with respect to its pitch and yaw axes that is light in weight, extremely reliable, requires less complex positioning controls and is relatively free from drift.

The radiation that is detected from the stars is used to obtain error signals for a roll servo system. Only one sensor head is required to detect the radiation and generates signals capable of producing error signals for the roll servo system. The sensor utilizes the apparent motion of the stars seen by the satellite's field of view whenever roll, that is rotation, occurs about the local vertical, the axis from the satellite's center point, to the earth's center. This motion is translated into an equivalent modulating frequency which is detected at the output as a proportional voltage.

Basically, the present invention may be divided into optical, mechanical, photosensitive, and electronic subsystems. The optical subsystem includes the light-gathering elements giving the proper field of view. The mechanical subsystem includes the chopper blade and motor. The chopper continuously interrupts and passes the stellar light at a preselected carrier frequency so that the system is always receiving an A.-C. signal. The photosensitive device is a detector that changes or transforms this A.-C. light signal into an equivalent A.-C. voltage. Lastly, the electronic subsystem translates any change in frequency from the carrier reference into a proportionate D.-C. voltage.

For the purposes of better understanding of applicants' invention, consideration will be given to a single stationary star and satellite as illustrated in FIGURE 1. If the chopper frequency of the chopper shown in FIGURE 1 is $f_c$ and is zero, then for zero roll, a constant amount of light impinges on the detector. However, if the satellite rolls so that the star at $A_1$ appears to move to $A_2$, then the starlight at the detector is continuously interrupted by the stationary chopper at some resulting frequency $f_e$. This $f_e$ is a measure of the roll rate of the missile or vehicle.

In order to sense the roll rate direction, the chopping frequency is made to have some finite value. Then, if the roll is in the opposite direction to that of the chopper blade, this single star will appear to travel across each chopper slit at a faster rate and this will result in a rise in frequency at the detector. Conversely, if the roll is in the same direction as the chopper blade travel, a decrease in observed frequency results at the detector.

The roll rate information is contained in the modulating frequency $f_e$ where:

$f = f_c \pm f_e$,
$f_c$ = chopping frequency,
$f$ = total frequency sensed by detector, and
$f_e$ = modulating frequency.

It will be recognized that the chopping frequency $$f_c = nK$$

where $n$ = revolution/sec. of the chopper motor
$K$ = number of slits in the chopper blade.

In FIGURE 2 there is shown the relationship between the roll angle and the electrical angle. To calculate the modulating frequency, $f_e$, reference is now made to FIGURE 2.

Since $f_e$ is a function of the relative motion between the satellite and the star, this motion may be represented as the star being stationary and satellite rolling, or the satellite being stationary and the star having an equivalent angular motion. The following discussion will illustrate the latter approach. Because of the tremendous distances involved between satellite and star, the error involved in placing the roll axis at the lens center as shown in FIGURE 2 instead of at the satellite center is negligible.

Referring back to FIGURE 1, when the star apparently moves from $A_1$ to $A_2$, a roll angle, $\theta_r$ results (see FIGURE 2). If we let $S$ = width of the chopper slit, $\overline{S}$ = width between chopper slits, and $s$ = distance at the detector corresponding to the travel of $A_1 \rightarrow A_2$, since the field of view subtended by each chopper slit is very small, the distances from the lens center to any point on the chopper over the distance $(S + \overline{S})$ is essentially the focal length F. Thus $$\theta_r = \frac{s}{F} \quad \text{(Equation 1)}$$

Since one cycle is equal to the image traveling a distance $S + \overline{S}$, then the following equation results:

$$\frac{s}{(S+\overline{S})} = \frac{\theta_e}{2\pi}$$

where $\theta_e$ = equivalent electrical roll angle. Thus $$\theta_r = \frac{(S+\overline{S})\theta_e}{2\pi F} \quad \text{(Equation 2)}$$

Differentiating Equation 2 with respect to time there results:

$$\dot{\theta}_r = \frac{(S+\overline{S})(2\pi f_e)}{2\pi F} \quad \text{(Equation 3)}$$

$\dot{\theta}_r$ = angular radian roll rate

Therefore $$f_e = \frac{F \dot{\theta}_r}{(S+\overline{S})} \quad \text{(Equation 4)}$$

and the total frequency seen by the detector will be:

$$f = f_e \pm f_c \quad \text{(Equation 5)}$$

(Equation 5)

As seen from Equation 4, for any roll rate $\dot{\theta}_r$, the resulting modulating frequency can be increased by using large focal lengths and narrow slits and slit separations. Obviously, the larger $f_e$ is, the easier it will be to measure.

The usable radiation at the detector, assuming all transmission coefficients are unity, is given by the following equation:

$$P_s = \frac{I \pi E^2}{4}$$

where $P_s$ = total usable radiation impingent on the detector in watts,
$I$ = stellar illumination at the detector, in $$\frac{\text{watts}}{\text{cm.}^2}$$

and $D$ = diameter of collecting lens.

Obtaining as large a radiation signal as possible would be most advantageous. Therefore, the lens diameter should be as large as possible, consistent with the space limitations in a particular system. It should further be noted that for a point source of light, the amount of radiation would be independent of the focal length.

As has been mentioned before, the above discussion has been limited to a single star. In reality the sensor "sees" many stars. Thus the total signal at the detector will be the sum of the contributions from each star in the field of view. A finite roll will impart the same apparent angular rate to all the stars so that $f_e$ will not vary. However, the magnitudes will vary and so will the phase relationships. If the chopper slit is much smaller than the width of the detector, the waveform at the detector from each star is essentially a square wave.

The Fourier representation of a square wave consists of all sine terms, or all cosine terms, depending where the reference axis is chosen. Therefore, assuming that each star contributes a pulse train $Y_k$, which is long enough to be represented by $$Y_k = \sum_{n=1}^{\infty} A_{kn} \sin[n(\omega_c \pm \omega_e)t + \phi_k]$$

where $\phi_k$ = phase lag and is constant for each star. The total waveform $Y_t$ is:

$$Y_t = \sum Y_k = \sum_{k=1}^{N} A_{k1} \sin[(\omega_2 \pm \omega_e)t + \phi_k] + \sum_{k=1}^{N} A_{k2} \sin[2(\omega_c \pm \omega_e)t + \phi_k] + \cdots$$

By using a bandpass amplifier in the electronics subsystem, which will not pass frequencies much greater than $f_c$, all the harmonics are eliminated, so that the signal output frequency remains undistorted, with some phase lag added.

It will be recognized that the above derivation implicitly assumed that each star's contribution could be approximated by an infinite pulse train. This is not quite true. The pulse trains are finites and this results in a very small band spread about each harmonic adding a measure of uncertainty to the system output as illustrated in FIGURE 3.

The physical position of the roll rate sensor in the satellite is such that it faces directly toward, or opposite, the desired direction of travel. Its optical axis is perpendicular to the local vertical as shown in FIGURE 4. While the following derivation is applicable for the sensor facing opposite the direction of travel, no difficulty would be involved in applying it to the situation where the sensor faces the direction of travel.

In the position shown in FIGURE 4, the stars will exhibit no apparent motion at zero roll as the satellite travels forward. If the satellite is initially at some constant roll angle, its optical axis will now have a component perpendicular to the satellite travel so that the stars will appear to be moving across its field of view. The present roll rate stabilization system has an inherent correction in it to any constant roll angle.

If the satellite is travelling with the velocity $v_0$ for a 90° roll angle, the optical axis will be perpendicular to the direction of motion and the stars will appear to be moving with the same velocity as $v_0$. At zero roll angle, the apparent star motion will be zero. For any roll angle less than 90° the stars will appear to be moving with a speed equal to the component of the space vehicle velocity perpendicular to the optical axis. In FIGURE 5 there is shown the orientation of a sensor at different roll angles as viewed from the earth. It is to be observed that $v_s$ (the apparent star velocity) is equal to $v_o \sin \theta$, where $v_o$ is equal to the satellite velocity and $\theta$ is equal to the angle between the optical axis and perpendicular to satellite velocity $v_o$. Thus, the modulating frequency $f_e$ can be represented by:

$$f_e = \dot{\theta}_{rs} \frac{F}{(S+\overline{S})}$$

where $\dot{\theta}_{rs}$ is the equivalent angular rate corresponding to the satellite velocity.

The minimum value of $v_s$ and thus, the minimum roll angle $\theta$, that the system is sensitive to, is a function of $f_e$. The smaller the $f_e$ that the system can read and detect, the tighter the limits placed on any zero drift in the roll angle.

In FIGURE 6 there is shown the pitch, yaw, and roll coordinates of the sensor and which define the pitch, yaw, and roll axes. In this discussion the chopper slits are oriented parallel to the roll axis when they cross the detector area. Motion about the pitch axis does not cause any roll rate error since the apparent star motion will be in a vertical direction. Only a star motion which crosses the chopper slits can cause any frequency variation.

Rotation about the yaw axis will cause some crosstalk. Yaw corresponds to all the vertical chopper slits which are in line with the detector, rotating about the detector area. In order to more fully appreciate applicants' invention, the assumption is that the chopper is stationary and that the stars revolve about the optical center line.

In FIGURE 7 there is shown the picture as seen at the detector. All the stars above the line AB have a velocity component across the slits in one direction, and all the stars below the line AB have velocity components across the slits in the opposite direction. The horizontal velocity components will differ, depending on the position of the star with respect to the line CD, and give rise to many values of $f_e$. If the stars seen by the detector are distributed statistically with respect to the line AB, then many $(f_c + f_e)$ and $(f_c - f_e)$ components will be present over a relatively wider bandspread about $f_c$. The average value over many cycles would then be $f_c$.

It is possible for a false modulating frequency to result if the stars are not distributed statistically. In this situation, a false roll rate signal will result. If this $f_e$ is smaller than the minimum $f_e$ to which the sensor is sensitive, then no output signal will result.

It is to be understood that applicants' sensor is not sensitive to the yaw angle $\theta_y$, but to the yaw rate $\dot{\theta}_y$, and at the same time is sensitive to $\dot{\theta}_R$ and $\theta_R$. Thus, if the false roll rate signal actuates the servo loop causing the satellite to rotate, a roll angle will result whose resultant signal will tend to counterbalance the error, until the yaw is corrected.

Turning briefly now to the use of a photomultiplier tube as a detector in applicants' system, the following discussion results. For a sixth magnitude star and average value of the useful energy at the cathode of a photo multiplier tube, such as a 1P21 is $$1.24 \times 10^{-15} \frac{\text{watts}}{\text{cm.}^2}$$

Making the assumption that the star is a point source, then the energy collected will be represented by the following equation:

$$P_s = I\, A_D$$

For a lens of 100 cm.² area $$P_s = 1.24 \times 10^{-15} \times 100 = 1.24 \times 10^{-13} \text{ watts}$$

The signal current resulting is $$i_s = P_s N = 1.24 \times 10^{-13} \text{ watts} \times 1.1 \times 10^4 \frac{\text{amps}}{\text{watt}} =$$

$1.36 \times 10^{-9}$ amperes where $N$ = responsivity =

$$1.1 \times 10^4 \frac{\text{amps}}{\text{watt}}$$

The noise current is mainly thermionic emission noise and for a given bandwidth B, the R.M.S. value is:

$i = \mu (2 e i_t B)^{1/2}$ where
$i_t$ = thermionic current at cathode = $10^{-14}$ ampere
$e$ = charge of electron
$B$ = bandwidth
$\mu$ = current amplification = $2 \times 10^6$ for $B = 1$ c.p.s $i_n 2 \times 10^6 [\times 10^{-14} \times 3 \times 10^{-19}]^{1/2} = 2 \times 10^6 [30 \times 10^{-34}]^{1/2} = 1.1 \times 10^{-10}$ $$\frac{i_s}{i_n} = \frac{1.36 \times 10^{-9}}{1.1 \times 10^{-10}} = 12.3$$

Allowing a safety factor of 15 percent for other causes of noise, namely that due to the random process of secondary emission, $$\frac{i_s}{i_n} = \frac{12.3}{1.15} = 10.7$$

It will be recognized that although the discussion has been directed to a photomultiplier as a detector, other detectors such as bolometers, photocells, etc. for visible, infrared, and ultraviolet may be used to practice the invention.

Two important measures of the system performance (neglecting noise) are (1) minimum roll rate that can be read, and (2) maximum angle the sensor must roll through before a reading results.

The minimum roll rate $\dot{\theta}_{R-min}$, is a function of the minimum frequency that can be measured by a particular electronic subsystem. Given this value of $f_{e-min}$, $\dot{\theta}_{R-min}$ is related by the following equation:

$$\dot{\theta}_{R-min.} = \frac{(S+\overline{S})}{F} f_{e-min.}$$

Obviously, the smaller $(S+\overline{S})/F$, the more sensitive the sensor. The maximum focal length is determined by the space limitations, and the chopper slit width is a function of the circle of confusion of the optical subsystem and the width of stars as seen by the detector. The maximum angle the sensor must roll through before a reading results is the maximum angle that a star can roll through without crossing a slit boundary. This angle $\theta_{RM}$ is defined by:

$$\theta_{RM} = \frac{S}{F}$$

Therefore, a small value of $\theta_{RM}$ also means a small value of $\dot{\theta}_{R-min}$.

Turning now from a theoretical description to a practical embodiment of a system for roll rate stabilization of a space vehicle, the discussion will be directed to FIGURE 8. In FIGURE 8 there is shown an optical subsystem 21 similar to that shown in FIG. 2. The optical subsystem includes a lens 23, chopping element 25, and a detector 27. In one embodiment chopping element 25 may comprise a simple disk with a plurality of slits therein to interrupt the light from the star field. Connected to the output of detector 27 is a preamplifier 29 which in turn is connected to a narrow band amplifier 31, a limiter 33, and a conventional frequency discriminator 35. Mechanically coupled to chopping element 25 is a chopper drive motor 37 which is electrically connected to a resolver 39 which in turn is coupled to frequency discriminator 35.

In operation, starlight or energy received from the stars is collected in the collecting optics 23 and is chopped at a frequency $f_c \pm f_e$. Visible detector 27 transforms the chopped energy into a proportional voltage which is fed through a preamplifier and narrow band amplifier 29 and 31, respectively, where the fundamental frequency component is extracted and limited.

As illustrated in the drawing the chopper 25 is geared to a chopper drive motor 37 and to a resolver 39 which also generates the fundamental frequency. The chopper drive motor may be any suitable, small, low-power consumption motor (either D.C. or A.C.). The speed regulation of the motor is not critical since the system eliminates the effects of the motor changing speed. The resolver is driven by drive motor 37 and generates a sinusoidal frequency which is directly proportional to the motor speed. Resolver 39 may be any small light weight device. The proportionally constant of the resolver relating frequency to motor speed can be suitably adjusted by changing the gear ratio between it and the motor. The voltage produced in limiter 33 is compared in frequency with the chopper voltage in the frequency discriminator whose output is proportional to the difference frequency $f_e$.

The frequency discriminator yields a voltage proportional to the magnitude of difference frequency $f_e$. As has been noted above, only a relative star motion which crosses the chopper slits can cause any frequency variation. It is to be recognized, therefore, that the roll sensor head must be mounted so that there is no relative star motion across the chopper slits when the vehicle is stabilized.

In FIGURE 9 there is shown an alternate embodiment of the invention. It is to be observed that similar components carry the same numbers with the prime as indicated in FIGURE 8. As shown in FIGURE 9, this embodiment employs a pair of choppers 25a and 25b to which the choper driver motor 37′ is geared. Choppers 25a and 25b rotate in opposite directions and pass in front of the collecting optics in opposite directions. In FIGURE 10 there is illustrated the particular type of design of choppers 25a and 25b.

As shown in FIGURE 10, the chopper slits cover only one-half of each chopper and are so arranged that during one revolution the detector 27′ sees through the slits of chopper 25a for half a cycle and through the slits of chopper 25b for the second half cycle. Because the choppers 25a and 25b pass detector 27′ in opposing directions, the detector first sees a $P_s(f_c+f_e)$ signal followed by a $P_s(f_c-f_e)$ signal, or the reverse situation may occur depending on the rotation and position of the choppers.

The output of detector 27′ is fed through a preamplifier 29′, narrow band amplifier 31′, and limiter 33′ where the fundamental frequency components are extracted similar to the embodiment shown in FIGURE 8. The resultant signal from limiter 33′ is then fed to a frequency discriminator 41′ which alternately delivers a voltage proportional to $f_c \pm f_e$ or $f_c \mp f_e$ as shown in FIGURE 11a. As noted in FIGURE 11a, the difference between the two extreme voltage levels is $2f_e$.

To obtain sense information, the output of the frequency discriminator 41′ is compared with a sinusoidal wave at $f_c$, from the chopper motor drive (see FIGURE 11b). Because the number of stars in the detector's field of view can vary, the phase angle of the signal ouput from the frequency discriminator 41′ will vary somewhat. The sinusoidal wave from the chopper motor will either be in phase or out of phase, depending on the direction of roll. The peak-to-peak output of the frequency discriminator, i.e., a voltage proportional to $2f_e$ at the correct sign is then amplified in amplifier 45 to give the required output magnitude.

It is to be observed that the distribution of stars in the heavens, and their relative brightness are important considerations. Stars are catalogued according to their relative brightness. Relative brightness is measured in terms of the dimensionless unit, magnitude, where the amount of useful light from a sixth magnitude star to which the detector is sensitive is $1/100$ of the useful light from a first magnitude star. If $I_a$ is the illumination at the detector from an $a$-th magnitude stars in watts/cm.², then the illumination from an $b$-th magnitude star $i_b$ is:

$$i_b = I_a 2.512 m_b - m_a$$

where $m_a$ and $m_b$ are the $a$-th and $b$-th mgagnitude, respectively.

The outputs from frequency discriminator 35 and amplifier 45 are utilized to apply a signal of sufficient magnitude to a space vehicle to stabilize its roll rate. This can be accomplished by any well-known scheme presently used to stabilize aircraft or space vehicles. For example, the output signal from discriminator 35 may be fed to an air-jet reaction type of system which corrects for roll rate or to an inertial wheel type of control system.

While particular embodiments of the invention have been shown and described herein, it is not intended that the invention be limited to such disclosures but that changes modifications can be made and incorporated within the scope of the claims.

What is claimed is:

1. A system for providing roll rate stabilization about a local vertical of a space vehicle utilizing the energy radiated from a group of stars within the field of view comprising means for translating the energy radiated from the group of stars into a correction signal proportional to the rate of roll deviation of the vehicle, and means for applying the correction signal to the space vehicle for stabilization of the roll rate of the vehicle.

2. A system for providing roll rate stabilization about a local vertical of a space vehicle utilizing the energy radiated from a group of stars within the field of view comprising means for translating the energy radiated from the group of stars into a modulated frequency, means for converting the modulated frequency into a correction signal proportional to the rate of roll deviation of the vehicle, and means for applying the correction signal to the space vehicle for stabilization of the roll rate of the vehicle.

3. A system for providing roll rate stabilization about a local vertical of a space vehicle utilizing the radiated energy from a random cluster of stars within the field of view comprising means for collecting the energy radiated from the star cluster, means for transforming the collected energy into a correction signal, and means for applying the correction signal to the space vehicle for stabilization of the roll rate of the vehicle.

4. A system for providing roll rate stabilization about a local vertical of a space vehicle utilizing the radiated energy from a cluster of stars within the field of view comprising means for collecting the energy radiated from the star cluster, means for transforming the collected energy into a modulated frequency, means for converting the modulated frequency into a correction signal proportional to the angular rate of deviation from the random cluster of stars, and means for applying the correction signal to the space vehicle for stabilization of the roll rate of the vehicle.

5. A system for providing roll rate stabilization about a local vertical of a space vehicle utilizing the radiated energy from a cluster of stars within the field of view comprising means for collecting the energy received from the cluster of stars, means for periodically interrupting the collected energy to preduce a correction voltage responsive to the rate of roll of the vehicle, and means for applying the correction voltage to the space vehicle for stabilization of the roll rate of the vehicle.

6. A system for determining the roll rate stabilization about a local vertical of a space vehicle comprising means for collecting energy received from a cluster of stars within the field of view, means for periodically interrupting the collected energy at a predetermined rate, means for transforming the energy that is periodically interrupted into a proportional voltage, said means for periodically interrupting the collected energy generating a reference voltage with the proportional voltage to produce an error voltage proportional to the roll rate of the vehicle.

7. An optical-electronic system that utilizes energy from a cluster of stars within the field of view to provide roll rate information comprising optical means for collecting the radiation from the cluster of stars, means for periodically interrupting the energy collected from the cluster of stars to produce a proportional voltage, means including said means for periodically interrupting the collected energy for producing a reference voltage, and means for comparing the reference voltage with the proportional voltage to produce an output voltage indicative of the roll rate of the system.

8. In a space vehicle including means for stabilizing the roll rate of the vehicle about a local vertical, means for providing correction signals to the roll rate stabilization means comprising means for translating the energy radiated from a cluster of stars within the field of view into error correction signals proportional to the rate of roll deviation of the vehicle, and means for applying the error correction signals to the stabilizing means for reorientation of the space vehicle.

9. In a space vehicle including servo means for stabilizing the roll rate of the vehicle about a local vertical, means for providing correction signals to the servo stabilization means comprising means for periodically interrupting energy collected from a cluster of stars within the field of view to produce proportional correction voltages responsive to the angular rate of roll deviation from the cluster of stars, and means for applying the proportional correction voltages to the servo stabilization means for reorientation of the space vehicle.

References Cited by the Examiner
UNITED STATES PATENTS

| | | | |
|---|---|---|---|
| 2,758,377 | 8/1956 | Claret | 244—14 |
| 2,931,912 | 4/1960 | Macleish. | |
| 2,942,118 | 6/1960 | Gedance. | |
| 2,981,842 | 4/1961 | Kaufold et al. | 244—14 X |
| 3,053,984 | 9/1962 | Hulett | 244—14 |

BENJAMIN A. BORCHLET, *Primary Examiner.*

FREDERICK M. STRADER, CHESTER L. JUSTUS, SAMUEL FEINBERG, *Examiners.*

D. G. REDINBAUGH, A. E. HALL, L. L. HALLACHER, M. F. HUBLER, *Assistant Examiners.*